Jan. 21, 1930. T. C. CROCE 1,744,297
CONTROL STICK FOR AEROPLANES
Filed Dec. 5, 1928
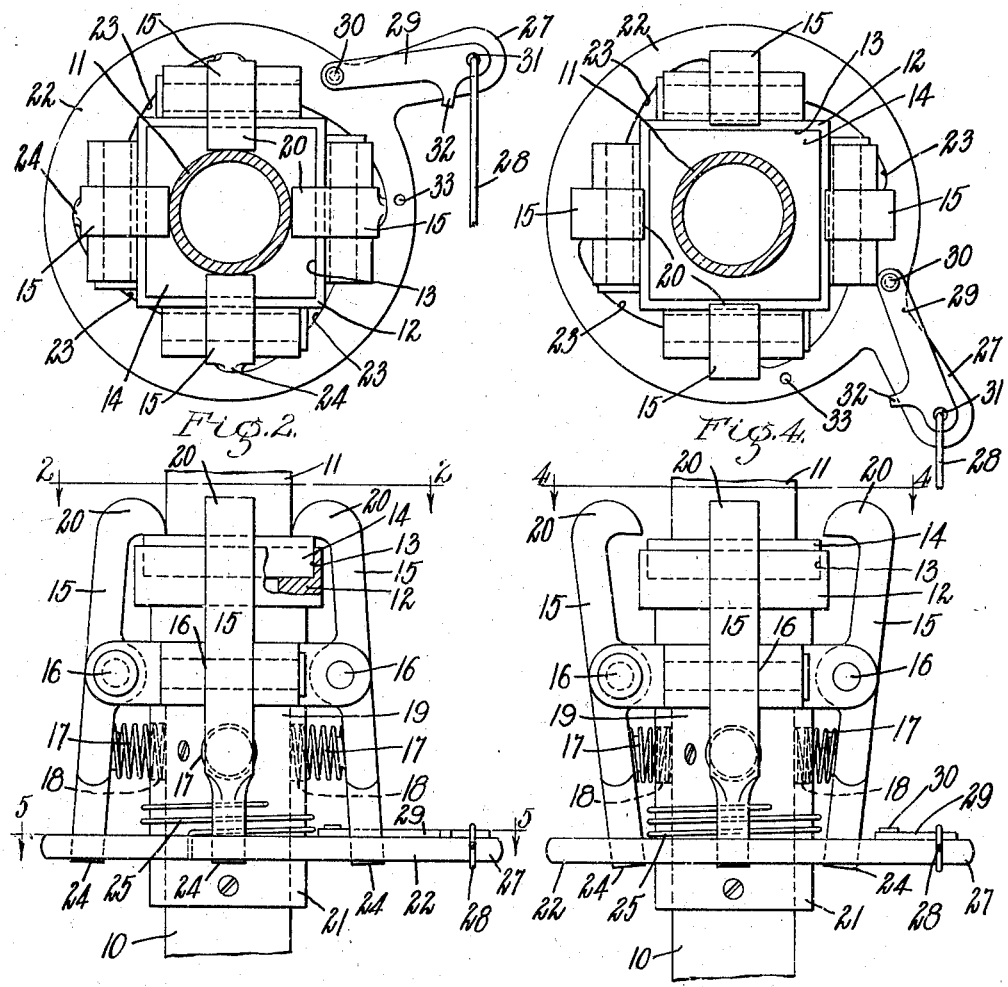
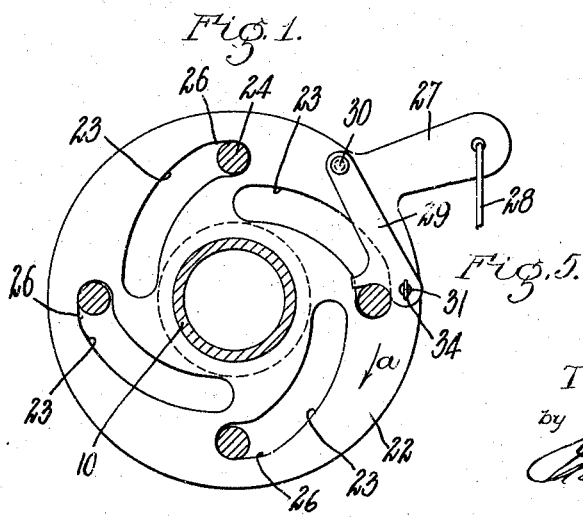
Inventor:
Thomas C. Croce.
by Charles L. Gooding, Atty.

Patented Jan. 21, 1930

1,744,297

UNITED STATES PATENT OFFICE

THOMAS C. CROCE, OF EAST BOSTON, MASSACHUSETTS

CONTROL STICK FOR AEROPLANES

Application filed December 5, 1928. Serial No. 323,878.

This invention relates to a control stick for aeroplanes and particularly to an improved mechanism for securing a detachable handle portion of a control stick to a main or lower portion of said stick.

The object of the invention is to provide a control stick of the type mentioned with a novel device whereby the detachable handle portion of the stick may be securely clamped to the main portion of the stick, the clamping means being locked in its clamping position and the locking means being adapted to be actuated to instantly release the stick portions one from another.

The device of this invention is an improvement upon a similar invention for which I have filed an application for patent entitled "Dual control device for aeroplanes", filed September 25, 1928, Serial No. 208,278, to which reference may be made, if it is so desired.

The invention consists in a control stick for aeroplanes as set forth in the following specification and particularly as pointed out in the claims thereof.

Referring to the drawings:

Figure 1 represents a side elevation of a portion of a separable control stick, together with the clamping mechanism for holding the portions of the stick together and locking means therefor embodying my invention, the stick portions being shown in their clamped position.

Fig. 2 is a horizontal section taken on the line 2—2 of Fig. 1.

Fig. 3 is a view similar to Fig. 1 illustrating the stick portions in their released position.

Fig. 4 is a horizontal section taken on the line 4—4 of Fig. 3.

Fig. 5 is a horizontal section taken on line 5—5 of Fig. 1.

Like numerals refer to like parts throughout the several views of the drawings.

In the drawings, 10 represents a main or lower portion of a control stick for aeroplanes and 11 is a handle portion for the control stick. The stick portions 10 and 11 are preferably constructed of metal and are tubular in form, and permanently secured at the upper end of the portion 10 of the stick is a member 12, in the upper extremity of which a squared recess 13 is formed. Located at the lower extremity of the handle portion 11 is a squared portion 14 which projects into and has a snug fit within the recess 13. The stick portions 10 and 11 are clamped securely together by a plurality of latches 15, each latch being pivotally attached at 16 to the member 12, and springs 17 are interposed between a portion of the latches 15 and the stick portion 10, being seated in openings 18 provided in a collar 19 rigidly fastened to the stick portion 10, and said springs act to normally force head portions 20 of the latches 15 into engagement with the upper surface of the squared portion 14 of the handle portion 11 of the control stick and thereby hold said handle portion firmly seated in the recess 13.

Rotatably mounted upon the stick portion 10 and positioned beneath the lower extremity of the collar 19 and the upper extremity of a collar 21 is a locking member 22 which is constructed in the form of a disc and has a plurality of cam slots 23 formed therein. The locking member 22 is so positioned that the lower extremities 24 of the latches 15 will project through the cam slots 23. A spring 25 encircles the collar 19 and engages the locking member 22 in a manner to normally position said locking member so that the portions 24 of the latches 15 will be located in portions 26 of the slots 23, said portions 26 being concentric with the axis of the locking member. The remainder of each slot 23 is formed eccentric to the axis of the locking member.

When the lower portions 24 of the latches 15 are located in the portions 26 of the cam slots, the head portions 20 of said latches will be locked in clamping engagement with the squared portion 14 of the handle portion of the control stick and it will be impossible for the latches to be moved without rotating the locking member.

A handle portion 27 is formed integral with the locking member 22 and projects laterally from the periphery thereof, and a flexible connection 28, as for example a chain or wire, is attached to said handle and extends therefrom to a point in the aeroplane where it may be operated by a pilot who is seated beside another control stick. The locking member 22 is operated by pulling upon the flexible member 28 and thereby rotating the locking member against the tension of the spring 25. As the locking member is rotated in the direction of the arrow a, Fig. 5, the eccentric portion of the slots 23 engaging the lower portions 24 of the latches 15 will cause said latches to be rocked upon their pivots 16 moving the latches from the position illustrated in Fig. 1 to the position illustrated in Fig. 3 and thereby releasing the handle portion 11 of the control stick.

As there are certain times when it is desirable that the locking member 22 shall be prevented from rotating to actuate the latches 15 to release the handle portion 11 of the control stick from the portion 10 of said stick, a means is provided to render the locking member inoperative as follows:— Resting upon the upper surface of the locking member 22 is a detent 29 which is pivotally attached at 30 to said locking member. In its normal or inactive position, the detent 29 projects outwardly from the body portion of the locking member and rests upon the handle 27 thereof, and an opening 31 provided in said detent aligns with the opening in the handle through which the flexible connection 28 extends, and the latter when being attached to the handle 27 is also passed through the opening 31 in the detent 29 in a manner to hold said detent in the position illustrated in Fig. 2.

Projecting laterally from the detent 29 is a finger 32 and when said detent is moved from the position illustrated in Fig. 2 to that illustrated in Fig. 5, the finger portion 32 will extends across one of the slots 23 of the locking member and in the path of one of the latches 15 in a manner to prevent a rotative movement of the locking member 22 to release the latches.

A hole 33 is provided in the locking member 22 and when the detent 29 is located in the position illustrated in Fig. 5 the hole 31 in the detent 29 will align with the hole 33 in the locking member and a cotter pin 34 is inserted through these holes in a manner to lock the detent 29 to the locking member.

The device of this invention is designed for use in connection with aeroplanes that are equipped with a dual control device, whereby two persons sitting one behind the other may control the operation of the aeroplane without changing their seats. Devices of this character are provided with two control sticks which are connected together to operate in unison and are generally a part of the equipment of aeroplanes that are used for instruction purposes, in order that the instructor may at all times be able to control the flight of the plane while instructing the pupil.

Assuming that the device of this invention is applied to the control stick operated by a pupil, if through inexperience or fright the pupil is improperly operating the aeroplane and grasps the handle portion 11 of the control stick in such a manner that the instructor cannot himself operate his own control stick, the instructor, by pulling the flexible connection, rotates the locking member 22 in the proper direction to release the latches 15 from engagement with the squared portion 14 of the handle portion 11 of the control stick, thereby releasing said handle portion from the lower portion 10 of the control stick. This renders the pupil powerless to operate the aeroplane and the latter is controlled by the instructor by means of his own control stick.

During the normal use of the device of this invention the latches 15 are locked in their normal or clamped position by means of the locking member 22 and the handle portion 11 of the control stick cannot be disengaged from the main portion 10 of said stick until the locking member 22 is rotated in a manner to actuate the latches 15 to disengage their head portions 20 from the squared portion 14 of the handle of the control stick.

When it is desired to render the locking means for the latches inoperative to release the stick portions one from another, the detent 29 is released from its position upon the handle 27 of the locking member 22 and swung upon its pivot 30 into a position as illustrated in Fig. 5 where it is secured by means of the cotter pin 34. At this time the finger 32 will be located in the path of one of the latches 15, making it impossible for the locking member 22 to be rotated either accidentally or by puling upon the flexible connection 28.

It will be evident that the device of this invention may be employed upon any type of aeroplane, whether the latter is equipped with a dual control mechanism or not, as it is always advantageous to have the handle portion of a control stick detachable from the main portion of said stick in order that mechanics working in the cockpit of the aeroplane may work in the vicinity of the control stick without being hindered by the presence of said stick.

I claim:

1. A control stick for aeroplanes embodying therein a main portion and a handle portion separable from each other, means to clamp said stick portions together, and means to lock said clamping means in a clamped position and also actuate the same to release the stick portions one from another.

2. A control stick for aeroplanes embodying therein a main portion and a handle portion separable from each other, means to clamp said stick portions together, and a rotatable locking member normally holding said clamping means in a clamped position and also adapted to actuate the same to release the stick portions one from another.

3. A control stick for aeroplanes embodying therein a main portion and a handle portion separable from each other, means to clamp said stick portions together, and a locking member rotatably mounted upon one of said stick portions and normally holding said clamping means in a clamped position and also adapted to actuate the same to release the stick portions one from another.

4. A control stick for aeroplanes embodying therein a main portion and a handle portion separable from each other, a plurality of latches mounted upon one of said stick portions and engaging the other stick portion and clamping the same together, and means to lock said latches in a clamped position and also actuate the same to release the stick portions one from another.

5. A control stick for aeroplanes embodying therein a main portion and a handle portion separable from each other, a plurality of latches mounted upon one of said stick portions and engaging the other stick portion and clamping the same together, and a locking member rotatably mounted upon one of said stick portions and provided with slots therein into which said latches project, said locking member holding said latches in clamped position and being adapted when rotated to actuate the same to release the stick portions one from another.

6. A control stick for aeroplanes embodying therein a main portion and a handle portion separable from each other, a plurality of latches mounted upon one of said stick portions and engaging the other stick portion and clamping the same together, and a locking member rotatably mounted upon one of said stick portions and provided with slots therein into which said latches project, said slots being eccentrically disposed to the axis of the locking member and being adapted when the locking member is rotated to actuate the latches to release the stick portions one from another.

7. A control stick for aeroplanes embodying therein a main portion and a handle portion separable from each other, means to clamp said stick portions together, means to lock said clamping means in a clamped position and also actuate the same to release the stick portions one from another, and means to render the locking means inoperative to release the stick portions.

8. A control stick for aeroplanes embodying therein a main portion and a handle portion separable from each other, means to clamp said stick portions together, a locking member rotatably mounted upon one of said stick portions and normally holding said clamping means in a clamped position and also adapted to actuate the same to release the stick portions one from another, and means to render the locking means inoperative to release the stick portions.

9. A control stick for aeroplanes embodying therein a main portion and a handle portion separable from each other, a plurality of latches mounted upon one of said stick portions and engaging the other stick portion and clamping the same together, means to lock said latches in a clamped position and also actuate the same to release the stick portions one from another, and a detent mounted upon the locking means and adapted to engage one of the latches whereby the locking means is rendered inoperative to release the stick portions.

In testimony whereof I have hereunto set my hand.

THOMAS C. CROCE.